United States Patent
Johri et al.

(10) Patent No.: US 10,012,200 B2
(45) Date of Patent: Jul. 3, 2018

(54) VEHICLE AND VEHICLE ENGINE START-UP CONTROL METHOD

(71) Applicant: FORD GLOBAL TECHNOLOGIES, LLC, Dearborn, MI (US)

(72) Inventors: Rajit Johri, Canton, MI (US); Jason Meyer, Canton, MI (US); Fazal Urrahman Syed, Canton, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 15/176,855

(22) Filed: Jun. 8, 2016

(65) Prior Publication Data

US 2017/0356414 A1 Dec. 14, 2017

(51) Int. Cl.
| | |
|---|---|
| *F02N 11/08* | (2006.01) |
| *F02N 11/04* | (2006.01) |
| *B60W 10/02* | (2006.01) |
| *B60W 20/40* | (2016.01) |
| *B60K 6/40* | (2007.10) |
| *B60K 6/46* | (2007.10) |
| *B60W 10/06* | (2006.01) |
| *F02N 15/08* | (2006.01) |

(52) U.S. Cl.
CPC ............ *F02N 11/0803* (2013.01); *B60K 6/40* (2013.01); *B60K 6/46* (2013.01); *B60W 10/02* (2013.01); *B60W 10/06* (2013.01); *B60W 20/40* (2013.01); *F02N 11/04* (2013.01); *B60W 2710/021* (2013.01); *B60W 2710/0644* (2013.01); *B60Y 2200/92* (2013.01); *B60Y 2400/46* (2013.01); *F02N 15/08* (2013.01); *Y10S 903/93* (2013.01); *Y10S 903/951* (2013.01)

(58) Field of Classification Search
CPC ...... F02N 11/0803; F02N 11/04; F02N 15/08; B60K 6/40; B60K 6/46; B60W 10/02; B60W 10/06; B60W 20/40; B60W 2710/021; B60W 2710/0644; B60Y 2200/92; B60Y 2400/46; Y10S 903/93; Y10S 903/951
See application file for complete search history.

(56) References Cited

U.S. PATENT DOCUMENTS

| | | | |
|---|---|---|---|
| 8,347,992 B2 | 1/2013 | Gecim et al. | |
| 8,412,396 B2 | 4/2013 | Swales et al. | |
| 2004/0084907 A1* | 5/2004 | Kuribayashi | F02D 41/062 290/40 A |
| 2006/0199696 A1* | 9/2006 | Gouda | B60K 6/48 477/3 |

(Continued)

*Primary Examiner* — Abby Y Lin
(74) *Attorney, Agent, or Firm* — David Kelley; Brooks Kushman P.C.

(57) ABSTRACT

A vehicle includes an engine, electric machine, starter-generator, and a controller. The engine and electric machine are each configured to propel the vehicle. The starter-generator is coupled to the engine and is configured to adjust engine speed during an engine start-up event. The controller is programmed to, in response to engine speed increasing towards a target speed during an engine start-up event, generate a target drag torque with the starter-generator to reduce overshoot of the target engine speed.

17 Claims, 3 Drawing Sheets

(56) References Cited

U.S. PATENT DOCUMENTS

| | | | |
|---|---|---|---|
| 2013/0006459 A1* | 1/2013 | Kim | B60K 6/445 |
| | | | 701/22 |
| 2013/0030625 A1* | 1/2013 | Park | B60W 10/06 |
| | | | 701/22 |
| 2014/0243149 A1* | 8/2014 | Holmes | B60W 20/30 |
| | | | 477/5 |
| 2016/0052510 A1 | 2/2016 | Aldrich, III et al. | |
| 2017/0009686 A1* | 1/2017 | Kamioka | F02D 41/0205 |

\* cited by examiner

VEHICLE AND VEHICLE ENGINE START-UP CONTROL METHOD

TECHNICAL FIELD

The present disclosure relates to control systems for hybrid vehicles.

BACKGROUND

During engine starts in a hybrid vehicle it may difficult to increase the engine speed without overshooting the desired speed target when the desired target speed is low (e.g., near idle speed). The intake manifold and engine cylinders may also be full of air charge during engine starts, requiring increased spark retard to reduce the amount of engine torque. The increase in spark retard alone, however, may not be sufficient to prevent engine speed overshoot.

SUMMARY

A vehicle includes an engine, electric machine, starter-generator, and a controller. The engine and electric machine are each configured to propel the vehicle. The starter-generator is coupled to the engine and is configured to adjust engine speed during an engine start-up event. The controller is programmed to, in response to engine speed increasing towards a target speed during an engine start-up event, generate a target drag torque with the starter-generator to reduce overshoot of the target engine speed.

A controller includes an input channel, output channel, and control logic. The input channel is configured to receive signals indicative of an engine speed during an engine start-up event. The output channel is configured to provide commands to operate a starter-generator that is coupled to an engine. The control logic is programmed to, in response to increasing engine speed during a start-up event, generate the command to operate the starter-generator to apply a target drag torque to the engine to reduce overshoot of a target engine speed.

A method of controlling a vehicle powertrain includes, in response to a speed of an engine increasing towards a target speed during a start-up event of an engine, increasing a load on the engine by generating a target drag torque with a starter-generator to reduce overshoot of the target speed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
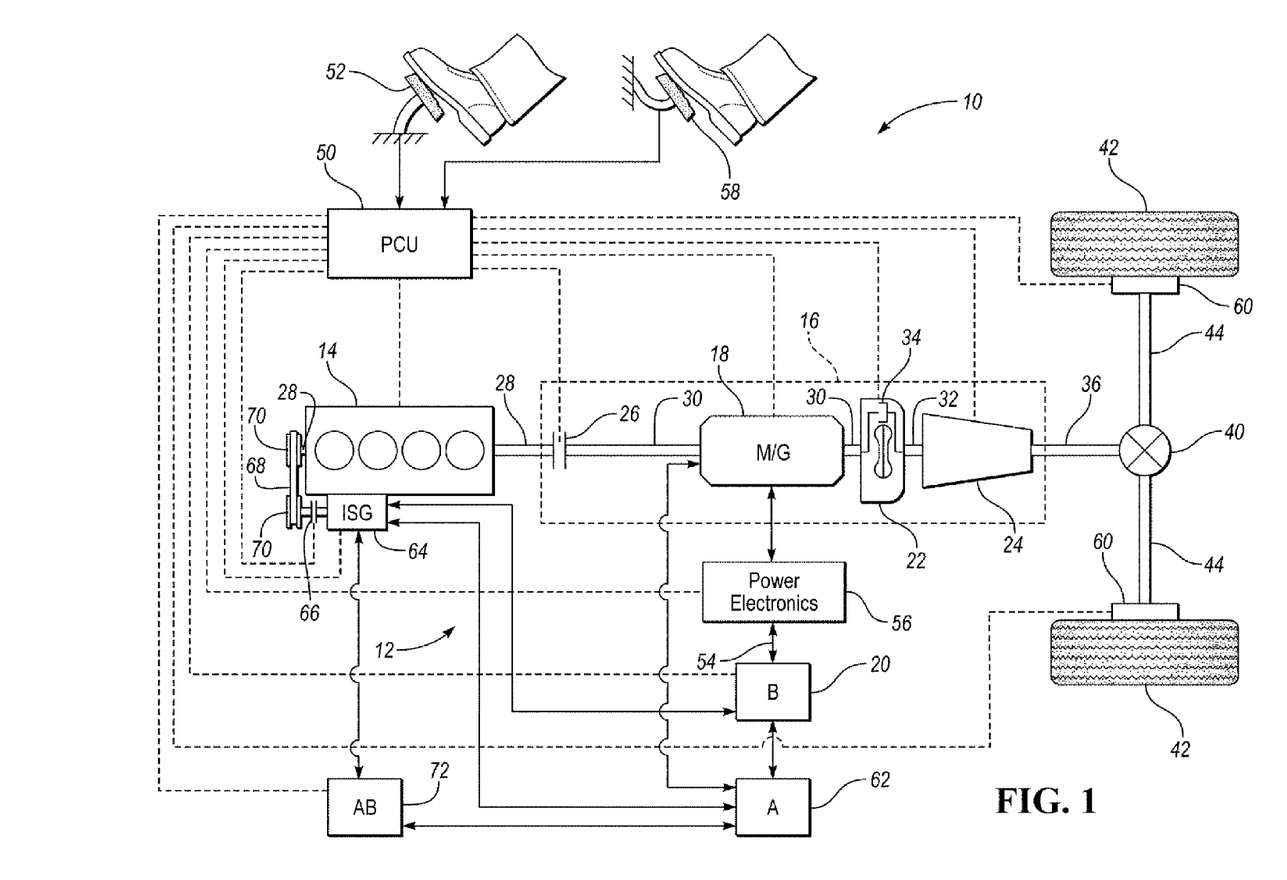
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel.

The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 2:
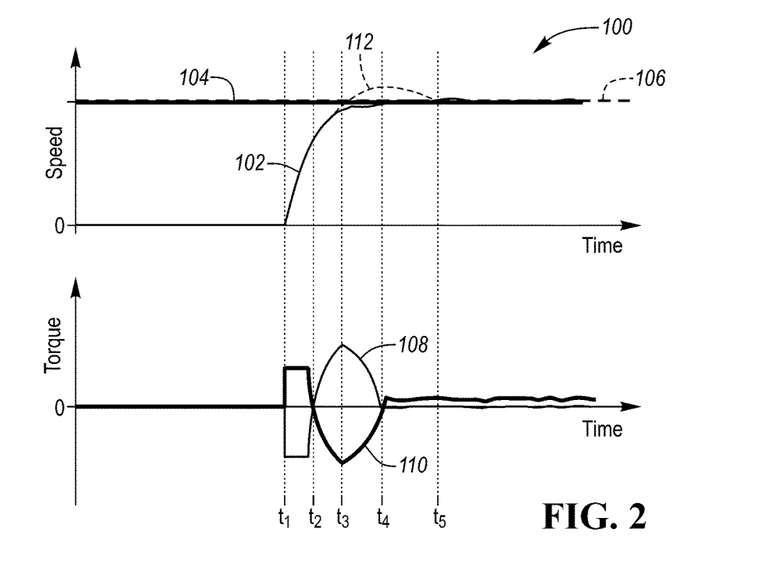
FIG. 2 is a graph illustrating engine speed, motor/generator speed, engine torque, and integrated starter-generator torque during an engine start-up event.

Referring to FIG. 2, a graph 100 representative of engine speed, motor/generator speed, engine torque, and integrated starter-generator torque during an engine start-up event is illustrated. The speed of the engine 14 plotted against time is represented by line 102, the speed of the M/G 18 plotted against time is represented by line 104, a target speed of the engine 14 is represented by line 106, the actual or measured torque of the engine 14 plotted against time is represented by line 108, and the torque of the ISG 64 is plotted against time is represented by line 110. The ISG 64 is configured to adjust the engine speed during the engine start-up event. At time $t_1$, the controller 50 is programmed to initiate the engine start by increasing the torque of the ISG 64 in order to increase the speed of engine 14. After the engine 14 begins to fire and once the engine 14 begins to produce positive torque at approximately time $t_2$, the controller 50 is programmed to command the ISG 64 to generate a target drag torque that increases the load on the engine 14. More specifically, between times $t_2$ and $t_4$ the controller 50 commands the ISG 64 to generate the target drag torque to reduce the amount of overshoot of the engine speed 102 relative to the target engine speed 106 (i.e., reduce the magnitude that the engine speed 102 exceeds the target engine speed 106 during the start-up event) when the engine speed 102 is increasing toward the target engine speed 106. The dotted line 112 located between times $t_3$ and $t_5$ represents the overshoot of the engine speed 102 relative to the target engine speed 106 when the target drag torque of the ISG 64 is not applied. Once the engine speed 102 approximately reaches the target engine speed 106 at time $t_4$, the ISG 64 is commanded to no longer provide the target drag torque and returns to operating as a either a motor to add torque to the powertrain 12 or as a generator to charge a battery or power accessories, as desired by the current conditions of the vehicle 10.

The intake manifold and engine cylinders may be full of air charge during engine starts. Therefore, increased spark retard (which is an increase in a delay in the spark timing from an optimal firing position of a piston which would produce the maximum power and torque) may be utilized to reduce the amount of engine torque to prevent the engine speed 102 from overshooting the target engine speed 106 during the start-up event. The increase in spark retard alone, however, may not be sufficient to prevent engine speed overshoot when the target engine speed 106 is low (e.g., near idle speed). Idle speed may include any incremental between 700 and 1,800 rpm. The ISG 64, in addition to retarding spark, may also reduce the amount of overshoot of the target engine speed 106 during engine the start-up event by generating a target drag torque. Increasing spark retard, however, may lead to an increase in fuel consumption and output of emissions because it will take longer for the engine 14 to obtain the target engine speed 106, since retarding the spark of the engine 14 reduces the power and torque output of the engine. Furthermore, if the engine start-up event occurs while the M/G 18 is rotating, the disconnect clutch 26 will be open until the engine speed 102 obtains the target engine speed 106, which will be approximately equal to the current operating speed of the M/G 104, in order to prevent disturbances within the remainder of the powertrain during the start-up event. Approximately equal to the current operating speed of the M/G 104 may include any incremental value between plus or minus 10% of the current operating speed of the M/G 104. When the disconnect clutch is open, power generated by the engine 14 cannot be transferred through the powertrain and to the wheels 42. Therefore, it is desirable to reduce the spark retard to reduce the time it takes for the engine speed 102 to obtain the target engine speed 106, which will increase fuel economy, reduce emissions, and reduce the time period from the beginning of the engine start-up event to the time the disconnect clutch 26 can be closed. The drag torque generated by the ISG 64 during the engine start-up event allows for a decrease in spark retard while simultaneously reducing the amount of overshoot of the engine speed due to the increased load on the engine 14.

The controller 50 may be programmed to decrease the amount of spark retard in the engine 14 in response to generating the target drag torque with the ISG 64 between times $t_2$ and $t_4$. Alternatively, the controller 50 may be further programmed to decrease the amount of spark retard in the engine 14 in anticipation of generating the target drag torque with the ISG 64 at any time before time $t_2$. The controller 50 may also be programmed to close the disconnect clutch 26 to couple the engine 14 to the M/G 18 in response to the engine obtaining the target engine speed 106, which may be approximately equal to the current operating speed of the M/G 104. The ISG 64 may be configured to convert kinetic energy into electrical energy when generating the drag torque between times $t_2$ and $t_4$ to charge the traction battery 20 or accessory battery 72. Alternatively, the ISG 64 may be configured to convert kinetic energy into electrical energy when generating the drag torque between times $t_2$ and $t_4$ to power the vehicle accessories 62.

Figure 3:
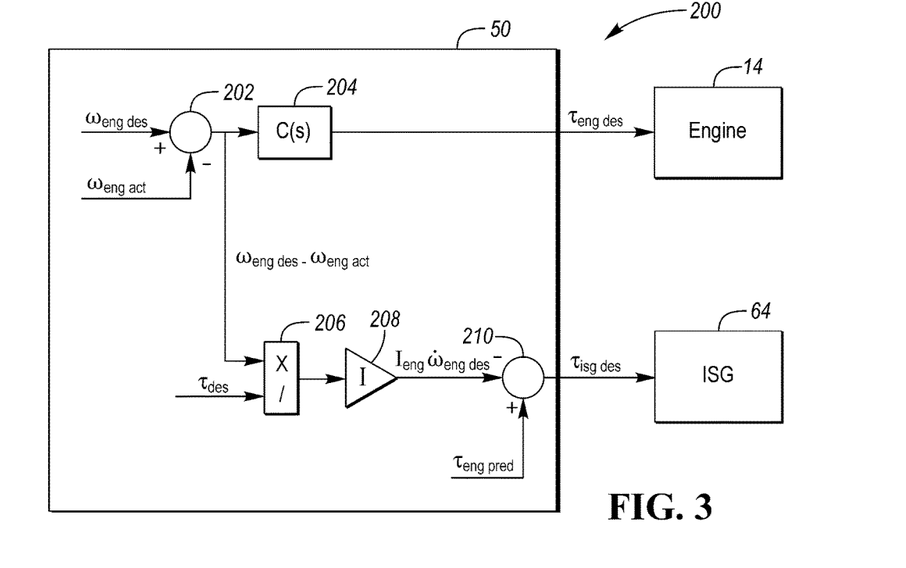
FIG. 3 is a control diagram illustrating a first method for controlling the engine and the integrated starter-generator during the engine start-up event.

Referring to FIG. 3, a control diagram representative of a first method 200 for controlling the engine 14 and the integrated starter-generator 64 during the engine start-up event is illustrated. The first method 200 is implemented by the controller 50 to control the engine 14 in speed control and the ISG 64 in torque control. The method 200 begins by subtracting the actual engine speed $\omega_{engact}$ from the target or desired engine speed $\omega_{engdes}$ at node 202. The desired engine speed $\omega_{engdes}$ is also represented as the target engine speed 106 in FIG. 2. The actual or current engine speed $\omega_{engact}$ is also represented as the engine speed 102 in FIG. 2.

The difference between the desired engine speed $\omega_{engdes}$ and the actual engine speed $\omega_{engact}$ is then input into the feedback controller 204 which generates the target or desired engine torque $\tau_{engdes}$, which is commanded to the engine 14. The feedback controller 204 that generates the target or desired engine torque $\tau_{engdes}$ may be any type of feedback controller known in the art. For example, the feedback controller 204 may include a proportional term, an integral term, and/or a derivative term. If the feedback controller 204 includes a proportional term and an integral term, the desired engine torque $\tau_{engdes}$ may be based on equation (1):

$$\tau_{engdes} = K_{p\_eng}e + K_{I\_eng}\int e \, dt \qquad (1)$$

e is the error (or difference) between the actual engine speed $\omega_{engact}$ and the desired engine speed $\omega_{engdes}$.

$K_{p\_eng}$ is the proportional gain term for the feedback controller 204.

$K_{I\_eng}$ is the integral gain term for the feedback controller 204.

The difference between the desired engine speed $\omega_{engdes}$ and the actual engine speed $\omega_{engact}$ is also input into a multiplication/division block 206. A target or desired time $t_{des}$ to obtain the desired engine speed $\omega_{engdes}$ is also input into the multiplication/division block 206. The difference between the desired engine speed $\omega_{engdes}$ and the actual engine speed $\omega_{engact}$ is divided by the desired time $t_{des}$ and multiplied by the moment of inertia of the engine ($I_{eng}$) 208 in the multiplication/division block 206 to obtain the target or desired inertia torque of engine $\tau_{enginertia}$, which is required to accelerate the engine to the desired engine speed $\omega_{engdes}$ in the desired time $t_{des}$. The desired inertia torque of engine $\tau_{enginertia}$ may be based on equation (2):

$$\tau_{enginertia} = I_{eng}\dot{\omega}_{engdes} \tag{2}$$

$I_{eng}$ is the moment of inertia of the engine.

$\dot{\omega}_{engdes}$ is the target or desired acceleration of the engine, which is the difference between desired engine speed $\omega_{engdes}$ and the actual engine speed $\omega_{engact}$ divided by the desired time $t_{des}$.

The desired acceleration $\dot{\omega}_{engdes}$ of the engine may be based on the following equation (3):

$$\dot{\omega}_{engdes} = (\omega_{engdes} - \omega_{engact})/t_{des} \tag{3}$$

The desired inertia torque of the engine $I_{eng}\dot{\omega}_{engdes}$ is subtracted from a predicted engine torque $\tau_{engpred}$ at node 210 to generate the target or desired torque of the ISG $\tau_{isgdes}$, which is commanded to the ISG 64. The desired ISG torque $\tau_{isgdes}$ is also represented as the torque of the ISG 110 in FIG. 2, including the target drag torque that is generated by the ISG 64 between times $t_2$ and $t_4$ in FIG. 2. The desired ISG torque $\tau_{isgdes}$ may be based on the equation (4):

$$\tau_{isgdes} = \tau_{engpred} - I_{eng}\dot{\omega}_{endges} \tag{4}$$

$I_{eng}\dot{\omega}_{engdes}$ is desired inertia torque of the engine 14.

$\tau_{engpred}$ is the predicted or current torque of the engine 14 based on the current air charge and spark timing of the engine 14.

Figure 4:
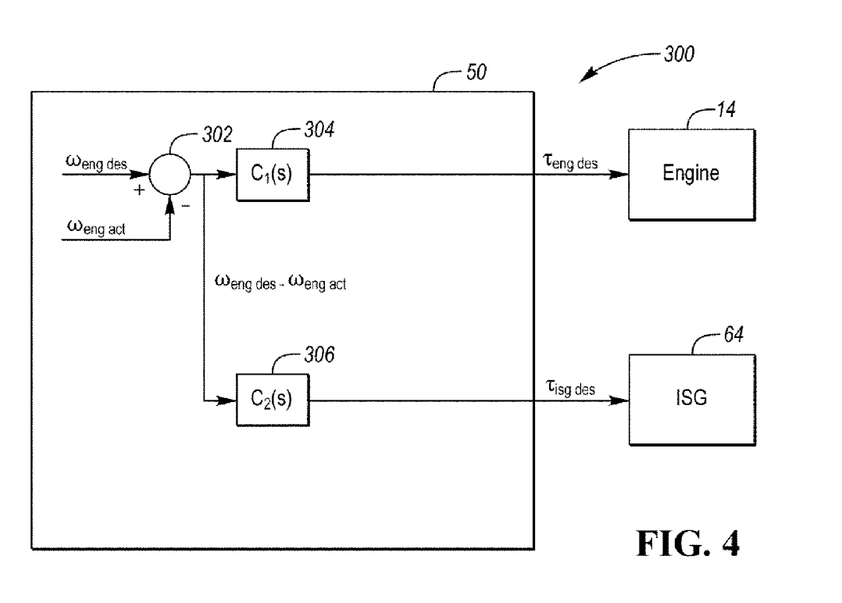
FIG. 4 is a control diagram illustrating a second method for controlling the engine and the integrated starter-generator during an engine start-up event.

Referring to FIG. 4, a control diagram representative of a second method 300 for controlling the engine 14 and the integrated starter-generator 64 during the engine start-up event is illustrated. The second method 300 is implemented by the controller 50 to control the engine 14 in speed control and the ISG 64 in speed control. The method 300 begins by subtracting the actual engine speed $\omega_{engact}$ from the target or desired engine speed $\omega_{engdes}$ at node 302. The desired engine speed $\omega_{engdes}$ is also represented as the target engine speed 106 in FIG. 2. The actual or current engine speed $\omega_{engact}$ is also represented as the engine speed 102 in FIG. 2.

The difference between the desired engine speed $\omega_{engdes}$ and the actual engine speed $\omega_{engact}$ is then input into the feedback controller 304 which generates the target or desired engine torque $\tau_{engdes}$, which is commanded to the engine 14. The feedback controller 304 that generates the desired engine torque $\tau_{engdes}$ may be any type of feedback controller known in the art. For example, the feedback controller 304 may include a proportional term, an integral term, and/or a derivative term. If the feedback controller 304 includes a proportional term and an integral term, the desired engine torque $\tau_{engdes}$ may be based on equation (1) above, with $K_{p\_eng}$ being the proportional gain term for feedback controller 304 and $K_{I\_eng}$ being the integral gain term for feedback controller 304.

The difference between the desired engine speed $\omega_{engdes}$ and the actual engine speed $\omega_{engact}$ is also input into the feedback controller 306 which generates the target or desired torque of the ISG $\tau_{isgdes}$, which is commanded to the ISG 64. The desired ISG torque $\tau_{isgdes}$ is also represented as the torque of the ISG 110 in FIG. 2, including the target drag torque that is generated by the ISG 64 between times $t_2$ and $t_4$ in FIG. 2. The feedback controller 306 that generates the desired ISG torque $\tau_{isgdes}$ may be any type of feedback controller known in the art. For example, the feedback controller 306 may include a proportional term, an integral term, and/or a derivative term. If the feedback controller 306 includes a proportional term and an integral term, the desired ISG torque $\tau_{isgdes}$ may be based on equation (5):

$$\tau_{isgdes} = K_{p\_isg}e + K_{I\_isg}\int e\,dt \tag{5}$$

e is the error between the actual engine speed $\omega_{engact}$ and the desired engine speed $\omega_{engdes}$, which is equal to the difference between the desired engine speed $\omega_{engdes}$ and the actual engine speed $\omega_{engact}$.

$K_{p\_isg}$ is the proportional gain term for the feedback controller 306.

$K_{I\_isg}$ is the integral gain term for the feedback controller 306.

The proportional gain terms and the integral gain terms for controller 304 and controller 306 may be selected such that the control of the engine 14 responds slower than the control of the ISG 64.

Figure 5:
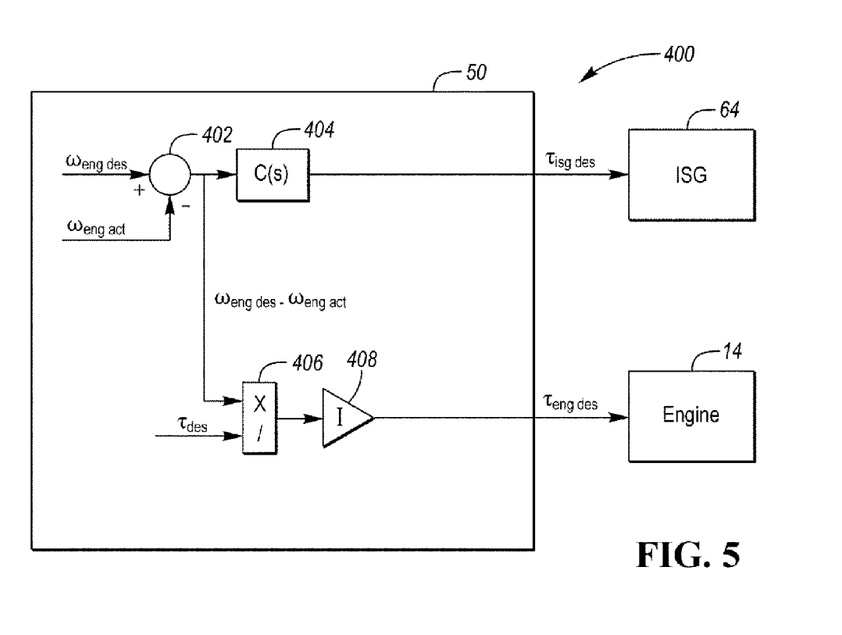
FIG. 5 is a control diagram illustrating a third method for controlling the engine and the integrated starter-generator during an engine start-up event.

Referring to FIG. 5, a control diagram representative of a third method 400 for controlling the engine 14 and the integrated starter-generator 64 during the engine start-up event is illustrated. The third method 400 is implemented by the controller 50 to control the engine 14 in torque control and the ISG 64 in speed control. The method 400 begins by subtracting the actual engine speed $\omega_{engact}$ from the desired engine speed $\omega_{engdes}$ at node 402. The desired engine speed $\omega_{engdes}$ is also represented as the target engine speed 106 in FIG. 2. The actual or current engine speed $\omega_{engact}$ is also represented as the engine speed 102 in FIG. 2.

The difference between the desired engine speed $\omega_{engdes}$ and the actual engine speed $\omega_{engact}$ is then input into the feedback controller 404 which generates the target or desired torque of the ISG $\tau_{isgdes}$, which is commanded to the ISG 64. The desired ISG torque $\tau_{isgdes}$ is also represented as the torque of the ISG 110 in FIG. 2, including the target drag torque that is generated by the ISG 64 between times $t_2$ and $t_4$ in FIG. 2. The feedback controller 404 that generates the desired ISG torque $\tau_{isgdes}$ may be any type of feedback controller known in the art. For example, the feedback controller 404 may include a proportional term, an integral term, and/or a derivative term. If the feedback controller 404 includes a proportional term and an integral term, the desired ISG torque $\tau_{isgdes}$ may be based on equation (5) above, with $K_{p\_isg}$ being the proportional gain term for feedback controller 404 and $K_{I\_isg}$ being the integral gain term for feedback controller 404.

The difference between the desired engine speed $\omega_{engdes}$ and the actual engine speed $\omega_{engact}$ is also input into a multiplication/division block 406. A target or desired time $t_{des}$ to obtain the desired engine speed $\omega_{engdes}$ is also input into the multiplication/division block 406. The difference between the desired engine speed $\omega_{engdes}$ and the actual engine speed $\omega_{engact}$ is divided by the desired time $t_{des}$ and multiplied by the moment of inertia of the engine ($I_{eng}$) 408 in the multiplication/division block 406 to obtain the target or desired torque of engine $\tau_{engdes}$, which is commanded to the engine 14. The desired torque of engine $\tau_{engdes}$ applied to the engine in the third method 400 for controlling the engine 14 may be based on equation (6)

$$\tau_{engdes} = I_{eng} \dot{\omega}_{endges} \quad (6)$$

$I_{eng}$ is the moment of inertia of the engine.

$\omega_{engdes}$ is the target or desired acceleration of the engine, which is the based on equation (3) above.

It should be understood that the vehicle configuration described herein is merely exemplary and is not intended to be limited. Other hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), or any other vehicle configuration known to a person of ordinary skill in the art.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an engine and an electric machine each configured to propel the vehicle;
   a starter-generator coupled to the engine and configured to adjust engine speed during an engine start-up event; and
   a controller programmed to,
   in response to engine speed increasing towards a target speed during an engine start-up event, generate a target drag torque with the starter-generator to reduce overshoot of the target engine speed, and
   in response to generating the target drag torque with the starter-generator during the engine start-up event, decrease an amount of spark retard of the engine.

2. The vehicle of claim 1, wherein the target drag torque is based on a difference between a current engine torque and an engine inertia torque required to increase engine speed.

3. The vehicle of claim 2, wherein the engine inertia torque is based on a difference between the target engine speed and a current engine speed.

4. The vehicle of claim 1, wherein the target drag torque is based on a difference between a target engine speed and a current engine speed.

5. The vehicle of claim 4, wherein the target drag torque is based on a proportional gain term and an integral gain term.

6. The vehicle of claim 1, wherein the starter-generator is configured to convert kinetic energy into electrical energy to charge a battery when generating the target drag torque to reduce overshoot of the target engine speed.

7. The vehicle of claim 1, wherein the starter-generator is selectively coupled to a crankshaft of the engine via a belt.

8. The vehicle of claim 1, further comprising a disconnect clutch configured to couple the engine the electric machine, and wherein the controller is programmed to, in response to the engine obtaining the target speed, close the disconnect clutch.

9. The vehicle of claim 8, wherein the target speed of the engine is a current operating speed of the electric machine.

10. A controller comprising:
    an input channel configured to receive signals indicative of engine speed during an engine start-up event;
    an output channel configured to provide commands to operate a starter-generator that is coupled to an engine; and
    control logic programmed to,
    in response to increasing engine speed during a start-up event, generate the command to operate the starter-generator to apply a target drag torque to the engine to reduce overshoot of a target engine speed, and
    in response to the starter-generator operating to apply the target drag torque, decrease an amount of spark retard of the engine.

11. The controller of claim 10, wherein the target drag torque is based on a difference between a current engine torque and an engine inertia torque required to increase engine speed.

12. The controller of claim 11, wherein the engine inertia torque is based on a difference between the target engine speed and a current engine speed.

13. The controller of claim 10, wherein the target drag torque is based on a difference between the target engine speed and a current engine speed.

14. The controller of claim 13, wherein the target drag torque is based on a proportional gain term and an integral gain term.

15. A method of controlling a vehicle powertrain comprising:
    in response to a speed of an engine increasing towards a target speed during a start-up event, increasing a load on the engine by generating a target drag torque with a starter-generator to reduce overshoot of the target speed; and
    in response to increasing the load on the engine by generating the target drag torque, decreasing an amount of spark retard in the engine.

16. The method of claim 15, further comprising in response to the engine obtaining the target speed, closing an engine disconnect clutch to couple the engine to an electric machine.

17. The method of claim 16, wherein the target speed of the engine is a current operating speed of the electric machine.

* * * * *